(12) United States Patent
Ditter et al.

(10) Patent No.: US 7,851,043 B2
(45) Date of Patent: Dec. 14, 2010

(54) LAMINATES OF ASYMMETRIC MEMBRANES

(75) Inventors: Jerry Ditter, Santa Ana, CA (US); Richard McDonogh, San Diego, CA (US); Steve Lamon, San Diego, CA (US); Todd Benson, San Diego, CA (US); Rey Sarabia, San Diego, CA (US); Mike Gaughan, San Diego, CA (US); I-fan Wang, San Diego, CA (US); Richard Morris, Longwood, FL (US)

(73) Assignee: Pall Corporation, East Hills, NY (US)

( * ) Notice: Subject to any disclaimer, the term of this patent is extended or adjusted under 35 U.S.C. 154(b) by 26 days.

(21) Appl. No.: 10/603,425

(22) Filed: Jun. 24, 2003

(65) Prior Publication Data

US 2005/0260381 A1    Nov. 24, 2005

Related U.S. Application Data

(63) Continuation of application No. 09/694,120, filed on Oct. 20, 2000, now Pat. No. 6,596,112.

(51) Int. Cl.
    *B01D 39/00*    (2006.01)
(52) U.S. Cl. .................... 428/137; 210/500.21
(58) Field of Classification Search ............. 428/131, 428/134, 136, 137, 138; 210/500.21
    See application file for complete search history.

(56) References Cited

U.S. PATENT DOCUMENTS

| | | | |
|---|---|---|---|
| 3,276,598 A | 10/1966 | Michaels et al. | |
| 3,556,305 A | 1/1971 | Shorr | |
| 3,567,810 A | 3/1971 | Baker | |
| 3,855,122 A | 12/1974 | Bourganel | |
| 3,894,166 A | 7/1975 | Brown et al. | |
| 3,951,815 A | 4/1976 | Wrasidlo | |
| 3,993,566 A | 11/1976 | Goldberg et al. | |
| 4,071,590 A | 1/1978 | Strathmann | |
| 4,230,463 A | 10/1980 | Henis et al. | |
| 4,230,583 A | 10/1980 | Chiolle et al. | |
| 4,250,029 A | 2/1981 | Kiser et al. | |
| 4,277,344 A | 7/1981 | Cadotte | |
| 4,280,909 A * | 7/1981 | Deutsch ................. | 210/490 |
| 4,360,434 A | 11/1982 | Kawaguchi et al. | |
| 4,387,024 A | 6/1983 | Kurihara et al. | |
| 4,429,122 A | 1/1984 | Zupancic | |
| 4,601,828 A | 7/1986 | Gershoni | |
| 4,659,474 A | 4/1987 | Perry et al. | |
| 4,772,391 A | 9/1988 | Baker et al. | |
| 4,778,596 A | 10/1988 | Linder et al. | |
| 4,814,082 A | 3/1989 | Wrasidlo | |
| 4,818,387 A | 4/1989 | Ikeda et al. | |
| 4,828,705 A | 5/1989 | Thakore et al. | |
| 4,863,604 A | 9/1989 | Lo et al. | |
| 4,873,037 A * | 10/1989 | Chau et al. ............... | 264/49 |
| 4,883,593 A | 11/1989 | Friesen et al. | |
| 4,885,077 A | 12/1989 | Karakelle et al. | |
| 4,902,424 A | 2/1990 | Wrasidlo | |
| 4,906,371 A * | 3/1990 | Miller ................... | 210/321.61 |
| 4,909,938 A | 3/1990 | Ford | |
| 4,917,942 A | 4/1990 | Winters | |
| 4,935,139 A | 6/1990 | Davidson et al. | |
| 4,939,180 A | 7/1990 | Hendy | |
| 4,941,893 A | 7/1990 | Hsieh et al. | |
| 4,983,288 A * | 1/1991 | Karbachsch et al. ... | 210/321.87 |
| 5,006,247 A | 4/1991 | Dennison et al. | |
| 5,024,765 A | 6/1991 | Linder et al. | |
| 5,028,337 A | 7/1991 | Linder et al. | |
| 5,032,450 A | 7/1991 | Rechlicz et al. | |
| 5,069,945 A | 12/1991 | Wrasidlo | |
| 5,133,878 A | 7/1992 | Gsell et al. | |
| 5,154,827 A | 10/1992 | Ashelin et al. | |
| 5,228,994 A | 7/1993 | Tkacik et al. | |
| 5,232,598 A | 8/1993 | Thomas et al. | |
| 5,236,588 A * | 8/1993 | Zhang et al. ........... | 210/500.35 |
| 5,376,442 A | 12/1994 | Davidson et al. | |
| 5,462,667 A | 10/1995 | Wollinsky et al. | |
| 5,496,627 A | 3/1996 | Bagrodia et al. | |
| 5,547,575 A * | 8/1996 | Demmer et al. ............ | 210/490 |
| 5,554,414 A | 9/1996 | Moya et al. | |
| 5,629,084 A | 5/1997 | Moya | |
| 5,672,399 A | 9/1997 | Kahlbaugh et al. | |
| 5,811,196 A | 9/1998 | Hachisuka et al. | |
| 5,834,107 A | 11/1998 | Wang et al. | |

(Continued)

FOREIGN PATENT DOCUMENTS

DE    21 10 1583    6/1979

(Continued)

OTHER PUBLICATIONS

PCT International Search Report, Dec. 13, 2001, PCT No. PCT/US 01/42262.

*Primary Examiner*—Alicia Chevalier
(74) *Attorney, Agent, or Firm*—Knobbe Martens Olson & Bear LLP

(57) ABSTRACT

The present invention is directed to composite filters and methods for preparing same. More specifically, it is directed to filter laminates of multiple discrete layers of material bonded together, with at least one of the layers being an asymmetric membrane.

21 Claims, 2 Drawing Sheets

U.S. PATENT DOCUMENTS

| | | | |
|---|---|---|---|
| 5,846,422 A * | 12/1998 | Ditter et al. | 210/500.41 |
| 5,935,370 A | 8/1999 | Weimer et al. | |
| 6,030,428 A | 2/2000 | Ishino et al. | |

FOREIGN PATENT DOCUMENTS

| | | |
|---|---|---|
| EP | 0 072 002 A1 | 2/1983 |
| EP | 0 083 489 A2 | 7/1983 |
| EP | 0 098 352 A3 | 1/1984 |
| EP | 0 216 622 A2 | 4/1987 |
| EP | 0 266 204 A2 | 5/1988 |
| EP | 0 503 596 A2 | 9/1992 |
| EP | 0 594 007 A1 | 4/1994 |
| EP | 0 677 368 A2 | 10/1995 |
| EP | 0 165 077 B2 | 2/1998 |
| EP | 0 963 775 A2 | 12/1999 |
| FR | 1 495 887 | 12/1977 |
| WO | WO 93/13408 | 7/1993 |

* cited by examiner

LAMINATES OF ASYMMETRIC MEMBRANES

RELATED APPLICATIONS

This is a continuation application of application Ser. No. 09/694,120, now U.S. Pat. No. 6,596,112 entitled LAMINATES OF ASYMMETRIC MEMBRANES, filed on Oct. 20, 2000, which application is hereby incorporated herein by reference in its entirety.

BACKGROUND OF THE INVENTION

1. Field of the Invention

The present invention is directed to composite filters and methods for preparing same. More specifically, it is directed to filter laminates of multiple discrete layers of material bonded together, with at least one of the layers being an asymmetric membrane.

2. Description of the Related Art

Composite filters are filters having multiple layers, and are useful in a variety of separations applications. In many cases, the various layers of a composite filter each impart different desirable properties to the filter. For example, in some applications, an extremely thin membrane may have advantageous flow rates in separations of very small particles, gasses, and the like. Yet such a thin membrane may be fragile and difficult to handle or to package into cartridges. In such cases, the fragile, thin layer membrane may be combined with a backing or with a stronger, more porous membrane, to form a composite having improved strength and handling characteristics without sacrificing the separations properties of the thin layer membrane. Other desirable properties imparted by laminating one membrane to another media may include increased burst strength, increased thickness, providing prefiltration capability, and providing an adhesive layer to ease assembly of a device.

A problem with some composite filters is that the layers may tend to separate in use, adversely affecting the strength and performance of the composite. This problem has been addressed in different ways. In some cases, the layers of desirable composites are laminated together to create bonds between the layers that assist in preventing layer separation (delamination). An example of such a membrane laminate is provided in U.S. Pat. No. 5,154,827. That reference describes a polyfluorocarbon microporous membrane made up of three or more sheets of aggregated microporous fluorocarbon polymer. A fine porosity sheet is laminated between sheets of larger porosity microporous fluorocarbon polymer. A mixing liquid or lubricant is layered between the sheets to facilitate binding and lamination of the sheets to each other, and the stack is laminated into an integral composite membrane under application of heat and pressure. Exploiting the strength provided by the outer layers, the laminate thus formed can be pleated and packaged into filter cartridges.

A different approach to making composite membranes is to cast or form one membrane layer in situ on top of another layer. The base layer may be a fibrous backing material or it may be a membrane. U.S. Pat. No. 5,240,615 discloses a smooth microporous polyvinylidene difluoride (PVDF) membrane laminated to a porous support. A PVDF-containing dope is applied to the porous support and then gelled to form the supported PVDF membrane. A primary advantage for this process, as disclosed in the '615 patent, is that the support prevents shrinkage of the PVDF material during gelling and drying. U.S. Pat. No. 5,433,859 discloses a supported microporous filtration membrane having a support layer with two different zones of microporous membrane being formed thereon. The membrane is made by applying a first casting solution onto the support layer, and then applying a second casting solution on top of the first. Both casting solutions are quenched simultaneously to form the supported membrane. This process forms a continuous, supported microporous membrane with two zones. The fibers of the support layer may penetrate into the adjacent membrane zone, but do not reach the second (top) membrane zone.

One of the primary benefits of composite membranes has been to provide a strong filter material having a relatively low resistance to flow. The greatest resistance to flow occurs in the region with the smallest pores. A composite of a very thin filtration membrane supported by a thicker, more open membrane thus minimizes flow resistance while maximizing strength. In addition, the support material may act as a prefilter, if the support material of the composite is upstream of the minimum pore material. The prefilter effect is especially beneficial in applications requiring a high dirt holding capacity, such as filtration of high particulate solutions, pyrogen removal, sterilization applications, and the like.

The advent of highly asymmetric polymer filters provided an improvement over composites for many applications requiring high flow rate and high dirt holding capacity. U.S. Pat. No. 4,629,563 discloses highly asymmetric microporous membranes with pores on one surface of the membrane having an average diameter 10 to 20,000 times smaller than the pores on the other surface of the membrane. The support layer between the membrane surfaces has flow channels whose diameters generally increase gradually in size along the distance from the minimum pore surface to the maximum pore surface. In the highly asymmetric membranes of the '563 patent and subsequent patents, the smallest pores reside in a relatively thin layer near one surface, and this thin layer of minimum pores thus offers little flow resistance, while the membrane as a whole exhibits the strength and high dirt holding capacity that had previously only been available with composites.

Thus, prior to the present invention, highly asymmetric membranes were seen as a very attractive alternative to composite membranes. The invention disclosed herein represents an advance in composite membrane technology, and a new application for highly asymmetric membranes.

SUMMARY OF THE INVENTION

In a first embodiment of the present invention, a filter laminate is provided including a plurality of discrete layers of material, each layer being adjacent at least one other layer, wherein at least one layer is an asymmetric membrane and at least one layer is a hot melt adhesive, the laminate including a bond between each of the adjacent layers, wherein the bond is formed after the formation of the material of the layers. The asymmetric membrane may have a first and a second surface, each of the surfaces including pores, wherein the pores of the second surface have an average diameter at least about 5 times greater than an average diameter of the pores of the first surface, more preferably 10 times greater. The asymmetric membrane may further include a support structure between the first surface and the second surface, wherein the support structure includes a reticular network of flow channels connecting the pores of the first surface with the pores of the second surface. The flow channels may generally increase gradually in diameter between the first surface and the second surface.

In another aspect, the asymmetric membrane includes an isotropic region and an asymmetric region, such that the support region includes a thickness between the first and second surfaces, wherein the thickness includes the isotropic region between one of the surfaces and a point within the support region, and an asymmetric region between the point and another of the surfaces, wherein the isotropic region includes flow channels that are substantially constant in diameter from the surface adjacent the isotropic region to the point between the isotropic region and the asymmetric region, and wherein the asymmetric region includes flow channels that gradually increase or decrease in diameter from the point to the surface adjacent the asymmetric region.

In a further aspect, the filter laminate includes an asymmetric membrane wherein the average diameter of the pores of the first surface thereof is between about 0.01 µm and about 10.0 µm, more preferably less than about 0.01 µm. The filter laminate may further include a first asymmetric membrane as a layer, and a second membrane as a distinct layer. The second membrane may be an asymmetric membrane including a first and a second surface, each of the surfaces including pores, wherein the pores of the second surface have an average diameter at least about 5 times greater than an average diameter of the pores of the first surface. The first asymmetric membrane layer may be bonded to the second asymmetric membrane layer. The first or second side of the first asymmetric membrane may be bonded to the first or second side of the second asymmetric membrane.

In a further aspect, at least one of the membranes includes a polymer additive on a surface thereof, the polymer additive contributing to the bond between the membranes. The polymer additive may include polyvinylpyrrolidone or polyethylenevinylacetate.

In a further aspect, the membrane is contacted with an adjacent layer and a bond is formed therebetween, wherein the membrane is wet when contacted with the adjacent layer, prior to formation of the bond. The bond between the adjacent layers may be formed in the presence of a temperature higher than a melting point of a component participating in the bond, and lower than a melting point of the asymmetric membrane.

In a further aspect, the asymmetric membrane of the filter laminate includes a polymer such as polyvinylidene fluoride, polyarylsulfone, polyethersulfone, polyarylsulfone, polyamides or cellulosic derivatives.

In a further aspect, the material of at least one of the layers of the laminate is polyester, polypropylene, polyolefin, polyethylene, nylon, paper, cellulose, glass fiber, acrylic, non-woven fibrous material, woven fibrous material, web, sheet, calendared, wet laid, dry laid, and extruded material. If the material is a sheet, the sheet may be liquid-impermeable.

In a further aspect, the filter laminate has a total thickness of less than about 1000 µm, more preferably less than about 500 µm, and most preferably between about 75 µm and about 350 µm.

In a further aspect, the filter laminate includes a hot melt adhesive, including thermoplastic, polyester, nylon, ethylenevinylacetate, polypropylene, polyethylene, web, non-woven material, woven material, powder, and solution hot melt adhesives.

In a further aspect, the filter laminate includes an asymmetric membrane that is cationically charged, anionically charged, hydrophobic, hydrophilic, or oleophobic.

In a second embodiment of the present invention, a filter laminate is provided including a plurality of discrete layers of material, each layer being adjacent at least one other layer, wherein at least one layer is an asymmetric membrane including polyvinylidene fluorides, polyamides, and cellulosic derivatives, the laminate including a bond between each of the adjacent layers, wherein the bond is formed after the formation of the material of the layers.

In a third embodiment of the present invention, a filter laminate is provided including a plurality of discrete layers of material, each layer being adjacent at least one other layer, including at least a first asymmetric membrane as a layer, and a second membrane as a distinct layer, the laminate including a bond between each of the adjacent layers, wherein the bond is formed after the formation of the material of the layers.

In a fourth embodiment of the present invention, a method of making a filter laminate is provided, including the steps of providing a first plurality of discrete layers of material; contacting the layers to form a first stack, wherein each layer is adjacent at least one other layer in the stack; forming a bond between adjacent layers in the first stack, wherein the bond is formed after the formation of the material of the layers, thereby forming a first laminated stack layer; contacting the first laminated stack with a second layer of material; and forming a bond between the first laminated stack layer and the second layer, wherein the bond is formed after the formation of the material of the layers, thereby forming a filter laminate.

In another aspect, the second layer includes a plurality of discrete layers, wherein at least one of the discrete layers includes an asymmetric membrane.

In a further aspect, the method further includes the step of forming a bond between adjacent layers in the second layer, wherein the bond is formed after the formation of the material of the layers, wherein the bond is formed before the step of forming a bond between the first laminated stack layer and the second layer.

In a further aspect, the method further includes the step of forming a bond between adjacent layers in the second layer, wherein the bond is formed after the formation of the material of the layers, and wherein the bond is formed substantially simultaneously with the step of forming a bond between the first laminated stack layer and the second layer.

In a further aspect, a bond is formed by heating a stack or a layer to a temperature of about 200° F. or less, a temperature of about 200° F. to about 395° F., or a temperature of from about 396° F. or higher.

In a fifth embodiment of the present invention, a method of making a filter laminate is provided including the steps of providing a plurality of discrete layers of material, wherein at least one layer is an asymmetric membrane and at least one layer is a hot melt adhesive; contacting each layer with at least one other layer to form a stack including at least two layers; and forming a bond between adjacent layers, wherein the bond is formed after the formation of the material of the layers, thereby forming a filter laminate.

In a sixth embodiment of the present invention, a method of making a filter laminate is provided including the steps of providing a plurality of discrete layers of material, wherein at least one layer is an asymmetric membrane including polyvinylidene fluorides, polyamides, or cellulosic derivatives; contacting each layer with at least one other layer to form a stack including at least two layers; and forming a bond between adjacent layers, wherein the bond is formed after the formation of the material of the layers, thereby forming a filter laminate.

In a seventh embodiment of the present invention, a method of making a filter laminate is provided including the steps of providing a plurality of discrete layers of material, wherein at least one layer is an asymmetric membrane and wherein at least one layer including polypropylene, polyolefin, polyethylene, nylon, paper, cellulose, glass fiber, or acrylic; contacting each layer with at least one other layer to form a stack including at least two layers; and forming a bond between adjacent layers, wherein the bond is formed after the formation of the material of the layers, thereby forming a filter laminate.

In an eighth embodiment of the present invention, a method of making a filter laminate is provided including the steps of providing a plurality of discrete layers of material, wherein at least one layer is an asymmetric membrane and wherein at least one additional layer is a membrane; contacting each layer with at least one other layer to form a stack including at least two layers; and forming a bond between adjacent layers, wherein the bond is formed after the formation of the material of the layers, thereby forming a filter laminate.

In a ninth aspect of the present invention, a method for filtering ink is provided, the method including providing a filter laminate, the filter laminate including a plurality of discrete layers of material, each layer being adjacent at least one other layer, wherein at least one layer is an asymmetric membrane, the laminate including a bond between each of the adjacent layers, wherein the bond is formed after the formation of the material of the layers; and passing an ink through the filter laminate, whereby the ink is filtered.

DETAILED DESCRIPTION OF THE PREFERRED EMBODIMENT

Figure 1:
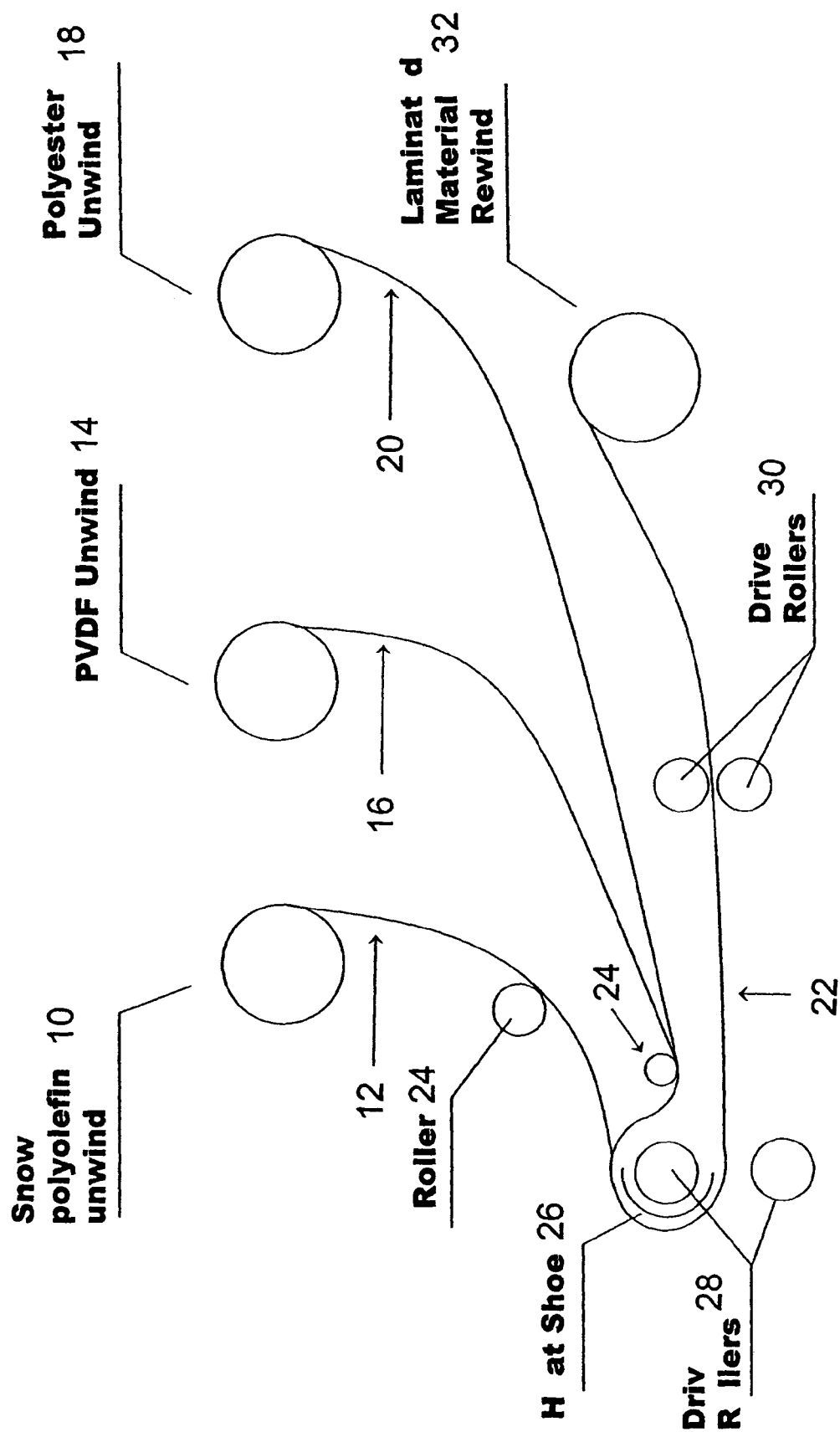
FIG. 1 is a schematic representation of a side view of a lamination apparatus as may be used according to the invention to form a filter laminate consisting of a polyolefin layer, a polyvinylidene fluoride layer, and a polyester layer.

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

The present invention provides filter laminates made from multiple layers of pre-formed material. At least one of the layers is an asymmetric membrane, and is preferably a highly asymmetric membrane. Previously, highly asymmetric membranes were seen more as an alternative to some filter composites, because of their typically high strength and dirt holding capacity. Pre-formed highly asymmetric membranes have not heretofore been included in composite laminates, layered with other highly asymmetric membranes or other pre-formed materials. The novel laminates that include highly asymmetric membranes offer advantages of providing greater membrane integrity while maintaining advantageous flow rates, and of allowing use of ultrathin highly asymmetric membranes in applications requiring high membrane strength and/or flexibility.

In addition to highly asymmetric membranes, in another preferred embodiment, the asymmetric membrane used in the laminate may have a mixed isotropic and asymmetric structure. The membrane or membranes used in the laminate may be oleophobic, hydrophobic or hydrophilic, charged or uncharged. Hydrophilic membranes may be surface treated with a hydrophilic polymer or other hydrophilic substance, and/or may be inherently hydrophilic, having a hydrophilic polymer or other hydrophilic compound as an integral part of the structure of the membrane. Likewise, the asymmetric membranes employed in the composite may carry anionic or cationic moieties or charges, either as surface treatments or as an integral part of the membrane structure.

Preferred asymmetric membranes for use in the present invention include those disclosed in issued U.S. Pat. Nos. 4,629,563; 5,834,107; 5,846,422; 5,886,059; 5,906,742; 5,958,989, 6,045,899, 6,045,694; and in U.S. patent application Ser. Nos. 09/289,277 and 09/289,563, filed on Apr. 9, 1999; and Ser. No. 09/323,709, filed on Jun. 1, 1999; the disclosures of which are all incorporated herein by reference.

In one embodiment, the invention provides a high strength filter laminate that includes as one or more layers an ultrathin polyvinylidene fluoride asymmetric microfiltration membrane and/or ultrafiltration membrane with or without permanent hydrophilicity. The filter is made by laminating a wet polyvinylidene fluoride membrane to a nonwoven support. The resulting supported membrane gives exceptionally high water flow rate and excellent physical strength. Hydrophilic asymmetric polyvinylidene fluoride membranes often curl when being oven dried. The present invention eliminates this problem by laminating the polyvinylidene fluoride membrane to a support before it is dried. This supported membrane is particularly useful in the beverage and wine industry as well as in medical devices and in ultrapure water applications.

Another embodiment of the present invention provides filter laminates made of at least two asymmetric membranes with the membranes being bonded together in any of three different possible orientations. A typical highly asymmetric membrane has a surface with small pores and an opposite surface with much larger pores. The small pore surface is often referred to as the skin, and usually has a shiny appearance. The opposite surface has much larger pores, is typically dull in appearance, and is often referred to as the "open" side of the membrane.

In the microporous membrane art, the term "skin" may have a somewhat different meaning than it does in reference to membranes used in gas separation, reverse osmosis, and ultrafiltration. In the latter arts, the skin of a membrane is a relatively dense layer that may not have any pores visible within the resolution limits of electron microscopy. In a microporous membrane context, the skin is simply the surface with the smallest pores. The skin is not necessarily dense, and typically does have pores that can be visualized using scanning electron microscopy.

The three different possible orientations for a laminate wherein two asymmetric membranes are adjacent each other are skin-to-skin, skin to open, and open to open. Each orientation offers characteristics that prove useful for certain applications. The skin-to-skin orientation is particular useful in applications that require very high efficiency size exclusion, good flow rate, and high dirt holding capacity. Examples are filtration uses that demand very high degrees of particle and bacterial retention, such as in pharmaceuticals, certain food and beverage applications, and the like.

For example, two asymmetric polysulfone membranes with nominal bubble points of 45 psi and mean flow pore (MFP) sizes of about 0.251 μm (BTS-45, available from US Filter, San Diego, Calif.) can be laminated together. Laminating these two membranes together reduces the flow by half, as expected. However, in a skin-to-skin configuration, the lamination increases the bubble point from the single layer of about 45 psi to about 76 psi, which translates to greatly improved membrane integrity and, therefore, improved bacterial and particle retention. The reason for the dramatic increase in bubble point is due to the fact that the probability of lining up two large pores (which are responsible for the bubble point) is significantly reduced because most of the pores are "average" size, and probability greatly favors the situation where a large pore is confronted by numerous smaller pores.

Simply placing two membranes together, skin-to-skin, without bonding them, may not reduce the bubble point because the test air that flows through the top layer can travel laterally until it finds a larger pore in the bottom layer. For the same reasons, bacterial retention with two skin-to-skin unlaminated membranes is typically not as good, and not as certain, as it is with two layers laminated together. A single layer with the same retention as two laminated BTS-45 membranes (i.e., with a bubble point of 76 psi), would have a permeability substantially less than the laminate. This is because the pore size distribution curve of the single-layer 76 psi membrane would be shifted dramatically toward the smaller pores, while the laminate retains the large number of average pores but has blocked off only the relatively few large pores. Essentially, therefore, the skin-to-skin laminate preserves the mode and lower end of the pore size distribution curve while minimizing the contribution of the upper end of the pore size distribution curve to the properties of the membrane. This provides a laminate with a higher bubble point but without a substantial change in the MFP size of the laminate as compared to its component membranes.

In another embodiment, two asymmetric membranes having different skin pore sizes may be laminated together in skin-to-skin juxtaposition. For example, a 0.45 µm membrane may be bonded, skin-to-skin, with a 0.22 µm membrane. Such a laminate has improved integrity as compared with either the 0.22 µm membrane or the 0.45 µm membrane alone, and also has better integrity than any adjacent but unbonded pair of such membranes in any combination (0.45 µm with 0.45 µm, 0.45 µm with 0.22 µm, or 0.22 µm with 0.22 µm). The retention of the 0.45 µm with 0.22 µm, skin-to-skin, laminate is not as great as a skin-to-skin laminate of two 0.22 µm membranes, but it has a higher flow rate. Accordingly, this aspect of the invention makes possible a beneficial combination of any two or more asymmetric membranes. The membranes to combine in this aspect of the invention may be selected based on the properties of each individual membrane and the desired properties of the filter laminate.

In many applications there is a need for multi-layer membranes, either two membranes of the same pore size (for added protection against contamination) or in different pore sizes (to improve throughput, or dirt holding capacity). If the membranes are not laminated together, there is a chance that they can separate during packaging into cartridges, during filtration, and/or during integrity testing.

All possible lamination orientations are useful and are contemplated in the present invention. In the skin-to-skin orientation, the laminate provides improve integrity and retention properties because it blocks off the relatively small number of large pores in both membranes and raises the bubble point substantially, as discussed above. Applications of this orientation include systems wherein it is critical that no particles or bacteria pass through the membrane. However, in a skin-to-skin laminate, the increasingly open structure through the thickness of the downstream membrane of the laminate provides no obstacles to shedding of particles therein. Thus, in applications where particle shedding is detrimental, it is important to the preserve the orientation of the laminate with respect to the direction of flow, so as not to induce shedding of particles trapped within the upstream membrane. Of course, in some applications, reversal of the direction of flow may be highly desirable as a means of backwashing the laminate.

The skin-to-open orientation is particularly useful when two different pore sizes membranes are laminated together. The open side of the more open membrane is generally oriented to be upstream, to improve the overall dirt holding capacity of the laminate. A beneficial feature of the skin-to-open orientation is that there is no downstream shedding when the skin side of the downstream membrane of the laminate is oriented downstream. The open-to-open orientation of the laminate is useful as a quality assurance "postfilter" wherein the fluid to be filtered is already substantially free of particles. Since the flow path through such a laminate would both begin and end with a membrane skin, the open-to-open laminate would very high confidence of non-shedding. Although certain advantages and applications of the membrane-to-membrane laminate embodiments of the invention have been discussed herein, the invention is not limited to these advantages and applications. Selection of membranes for lamination and selection of the desired orientation of lamination is a function of the desired properties of the final laminate, as will be appreciated by those of skill in the art.

In another embodiment of the invention, the laminate includes a nonwoven fabric between the membrane layers. The fabric may serve as a binding material and also may provide added strength to the composite as a whole. In a preferred embodiment, the membranes may be ultrathin, with the laminate having a total thickness of about 125 µm (5 mils). In such an arrangement, none of the fibers from the support material protrude through the membrane, a problem that is often encountered when casting a membrane directly onto a nonwoven support. Various membrane materials may be used in the laminates of the invention. Examples are membranes made of polysulfone, polyethersulfone, polyarylsulfone, polyvinylidene fluoride, nylon, and cellulosic derivatives.

The invention thus provides a filter laminate, with multiple discrete layers of material, with each layer being adjacent and bonded to least one other layer. At least one of the layers is an asymmetric membrane. In contrast to laminates that have a membrane cast onto a support layer, in the present invention the bond between the layers is formed after the formation of the material of the layers. In a preferred embodiment, the asymmetric membrane is a highly asymmetric ultrafilter or microfilter. The average diameter of the large pores on the dull or open side of the membrane is at least about 5 times larger, preferably between 10 and 20,000 times larger, than the average diameter of the pores on the skin or shiny side of the membrane. The asymmetric membranes may be gradually asymmetric, wherein the flow channels between the skin surface and the opposite surface generally increase gradually in size. As an alternative, the membranes may have a mixed isotropic and anisotropic structure, wherein the support structure of the membrane, between the two surfaces thereof, has a region with flow channels of relatively constant diameter. This region typically adjoins a region of flow channels with gradually increasing or decreasing diameters.

The asymmetric membranes used in the laminates of the invention may be microporous or ultraporous. While there is no clear size cutoff between microporous and ultraporous membranes, microporous membranes typically have skin pore sizes ranging from about 0.01 µm to about 10.0 µm. Ultraporous membranes (ultrafilters) are generally considered to have skin pores less than 0.01 µm in size. The bond between the layers may be formed by application of heat and/or pressure, and may be facilitated by addition of a polymer such as polyvinylpyrrolidone (PVP) or ethylene vinylacetate (EVA), or by other treatment of at least one of the layers involved in the bond. In a preferred embodiment, an asymmetric membrane is surface-treated with PVP, and the PVP participates in the bond between the membrane and the adjacent layer.

In addition to polymers that may be used to enhance the bond between the membrane layers, other materials can themselves constitute layers within the laminate and, in some embodiments, these additional layers can participate in the bonding of the laminate. Such materials may include nonwoven fabrics, glass fibers, woven fabrics, paper, cellulose, and polyamide. A particularly important type of nonwoven fabric for this application is one made from bicomponent fibers, which contain both a low melting and a high melting component. The low melting component is usually the outer layer. This configuration facilitates bonding to the membrane because the low melting component melts and forms a bond at a temperature at which the high melting component and the membrane both survive unchanged. The two components can be the same generic types, for example two polyesters, or the components can be of different types, such as polyethylene on polypropylene.

In a preferred embodiment, the laminate comprises an asymmetric membrane bonded to a hot melt adhesive. A hot melt adhesive is a solvent-free thermoplastic material that is solid at room temperature and is applied in molten form to a surface to which it adheres when cooled to a temperature below its melting point. For purposes of this application, a hot melt adhesive is a component of the laminate which is substantially melted in the lamination process. Hot melt adhesives are available in a variety of chemistries over a range of melting points. The hot melt adhesive can be in the form of a web, nonwoven material, woven material, powder, solution, or any other suitable form. In a preferred embodiment, the hot melt adhesive is in the form of a nonwoven material.

Preferably, a polyester hot melt adhesive is used. Such adhesives (available, e.g., from Bostik Corp. of Middleton, Mass.) are linear saturated polyester hot melts exhibiting melting points from 65° C. up to 220° C. and range from completely amorphous to highly crystalline in nature. Polyamide (nylon) hot melt adhesives, also available from Bostik, may also be used, including both dimer-acid and nylon-type polyamide adhesives. Other suitable hot melt adhesive chemistries used include EVA, polyethylene and polypropylene.

In some embodiments, it is preferable to contact the membrane with its adjacent layer when the membrane is wet, either by maintaining the membrane in water after it is quenched (skipping the usual oven drying step in membrane manufacture), or by rewetting the membrane after it has been dried. Forming a laminate with a membrane that has not been dried after being quenched may minimize shrinkage of the membrane, a characteristic that is common to certain membrane formulations. Another advantage of making the laminate from a wet membrane is that fewer process steps are required.

The conditions under which the lamination is carried out depend on the properties of the layers to be laminated, and any surface treatments thereon. The membrane is the most sensitive component in the lamination. Temperature, pressure, and tension must be considered. If the temperature reaches the glass transition temperature (change from a glass to an amorphous elastomer or semi-crystalline material), the membrane can be damaged. The glass transition temperature, $T_g$, for polysulfone is 190° C. (374° F.), and for polyethersulfone it is about 210° C. (410° F.). However, the membrane can frequently withstand temperatures in this range for a short period of time. Typically, the membrane is not in the hot zone at its glass transition temperature for more than a few seconds. PVDF has a melting temperature, $T_m$, of 170° C. (338° F.), but its upper service temperature is about 150° C. (302° F.). If heated much above 150° C., it may begin to soften and eventually melt.

The temperatures at which lamination was conducted were all based on the shoe temperature, not the membrane temperature. The actual membrane temperature was not determined but it would undoubtedly be several degrees less than that of the shoe. If the pressure exerted on the membrane is too great, the membrane can be crushed and densified. This effect may be minimized or avoided by using rubber rollers. Also, if the tension on the membrane as it is fed into the hot zone is too great, the pores can become distorted and the pore size changed.

Support and/or bonding layers may be selected from among a wide range of materials. Such materials include polyester, polypropylene, polyolefin, nylon, cellulosics, acrylics, and the like. Likewise, for filtration applications, the support and/or bonding material may be, for example, a nonwoven fibrous material, a woven fibrous material, or an open extruded material. In general, the thickness of the laminate is not critical. However, in some applications, such as those in which the laminate must fit within a confined space, thickness may be very important. The invention contemplates laminates of any useful thickness, wherein such laminates contain an asymmetric membrane as at least one layer. The preferred thickness of the laminate will depend upon the application, and may typically range from about 1 or 2 millimeters or more down to less than about 200, 100, or 50 microns.

The laminates are typically made by beginning with at least two layers of pre-formed material, with at least one of the layers being an asymmetric membrane. The materials are generally fed off individual rollers and sandwiched together before passing over the heated shoe or roller. The arrangement and orientation of the material of each layer is selected based on the use requirements of the laminate. Optionally a bonding material, such as, for example, PVP or EVA, may be coated onto one or more of the surfaces of one or more of the layers. The stack is then subjected to conditions sufficient to achieve a laminate, typically by application of heat. In addition to the materials of the laminate itself, the stack may also have one or more materials in contact with the top and/or bottom of the stack, to optimize heat transfer between the laminating apparatus and the stack, to prevent melting or distortion of any materials within the stack, or to prevent sticking of the laminate to the apparatus. For example, a thin sheet of ZITEX, a porous, relatively thick, polytetrafluoroethylene (PTFE) stock (Performance Plastics, Wayne, N.J.), held against the outer layer of the laminate as it is passed over the hot shoe, helps to confine the heat in the laminating layers.

In a preferred embodiment, the stack of materials is passed through a lamination apparatus, as schematically depicted in FIG. 1. Several unwinds are typically located on the top of the lamination apparatus to hold non-woven, woven, hot melt, and membrane materials. In FIG. 1, the apparatus includes an unwind 10 for a low melting point polypropylene nonwoven material 12, a membrane unwind 14 for a polyvinylidene difluoride membrane 16, and an unwind 18 for a polyester nonwoven material 20. As the material is unwinding, an adjustable, lateral spring force is applied to the unwind to maintain the stiffness of the material, thereby preventing formation of wrinkles in the laminate 22. Rollers 24 provide additional tension and also aid in wrinkle elimination. The position of the rollers 24 is adjustable to suit various materials. The layers of material 12, 16, 20 are then passed over a heat shoe 26, i.e., a heating element for bonding. Drive rollers 28 located under the heating element 26 may be used, but may cause wrinkling. After passing through heating element, an optional use slitting fixture (not shown in FIG. 1) slits the width of the laminate 22 down to the required dimension. The layers 12, 16, 20 are pulled out from the unwinds 10, 14, 18 and over the heat shoe 26 by feeding the resulting laminate 22 between two drive rollers 30 situated after the heat shoe 26. The drive rollers 30 are driven by an electric motor and chain (not shown in FIG. 1), and are set to pull the laminate 22 at a constant speed. Wind-ups for the trim slit off by the slitting operation (not shown in FIG. 1) are located under the machine. Another rewind 32 winds up the full width laminate 22.

Figure 2:
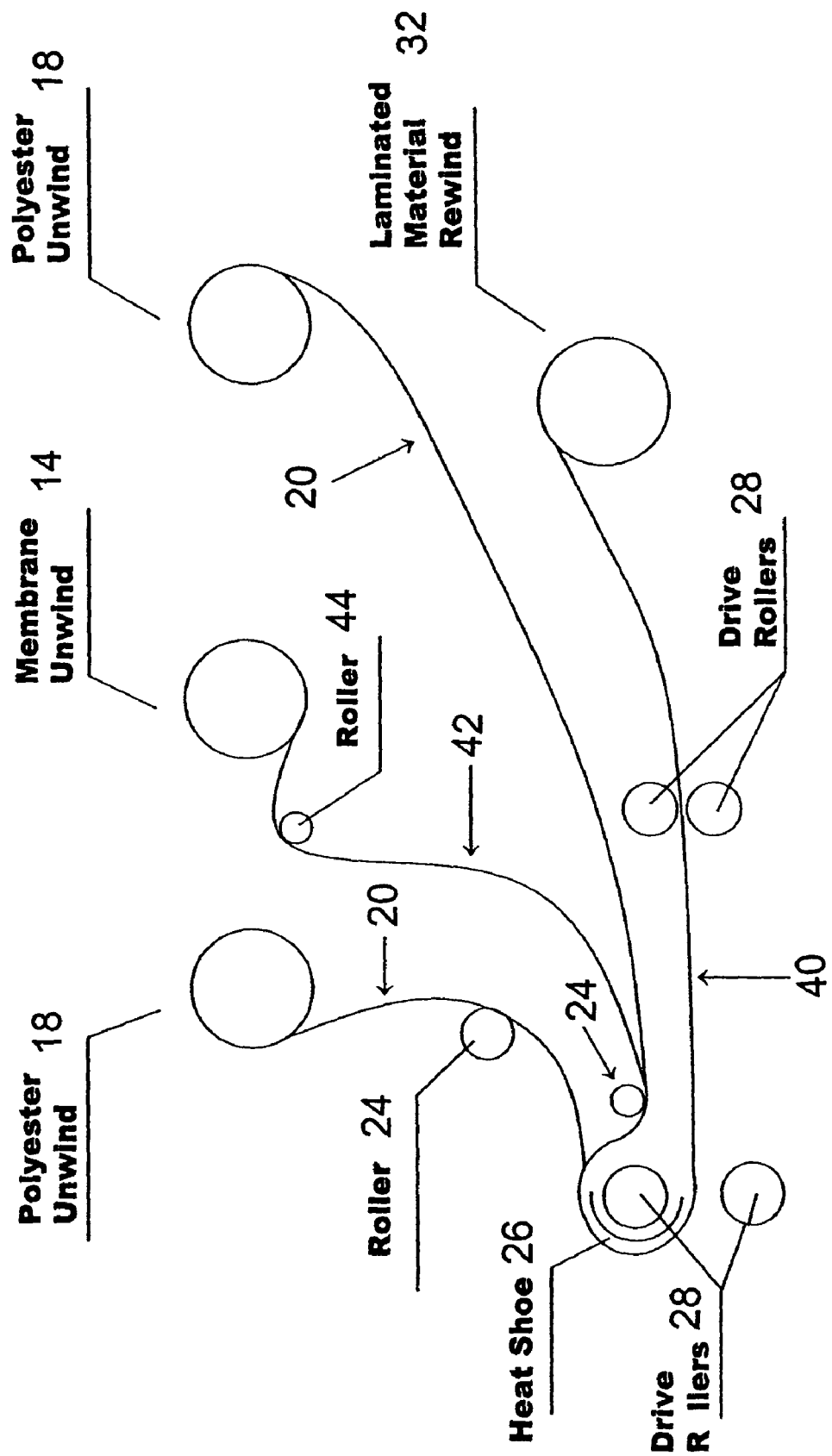
FIG. 2 is a schematic representation of a side view of a lamination apparatus as may be used according to the invention to form a three layer filter laminate consisting of a membrane layer sandwiched between two polyester layers.

FIG. 2 illustrates an apparatus for preparing a three-layer filter laminate 40 including a membrane layer 42 sandwiched between two polyester layers 20. In this apparatus, an additional roller 44 is situated after the membrane unwind 14 to provide additional tension.

EXAMPLES

Examples 1-2

Laminates Containing Asymmetric Polyvinylidene Fluoride Membranes

A membrane casting solution was prepared, containing 16% PVDF, 2.5% water, 15% n-butanol, 58% dimethyl formamide (DMF), 1.5% PVP (k-90) AND 7% PVP (k-30). Membrane samples were cast onto a moving belt of polyethylene coated paper using a casting knife. Following casting, the membranes were quenched in a water bath at about 65° C. After coagulation, the membranes were washed with deionized water and stored in deionized water.

A three layer composite was then assembled. The bottom layer was polyester (HOLLYTEX grade 3256, Ahlstrom Filtration, Mount Holly Springs, Pa.). The middle layer was the wet PVDF membrane made and stored as described above. The top layer was a low melting point polypropylene nonwoven material (grade 2432, from Snow Filtration, West Chester, Ohio). The layers were laminated as illustrated schematically in FIG. 1. Depending on the temperature of the upper and lower heat sources, the PVDF membrane can be laminated to either a polyester or polypropylene support.

For laminations in which the upper heat source was operated at a high temperature for PVDF (e.g., 150° C. (310° F.)), the laminate used a polyester support instead of a polypropylene support as shown in Example 1. The best hydrophilic supported membrane was Example 2, which gave a hydrophilic membrane with good water flow rate and no significant difference in MFP size as compared with the original unsupported PVDF membrane.

The laminates were tested for MFP size (in microns) and for water flow rate (in milliliters per minute) through a 47 mm diameter disc at 10 psid. Unless otherwise indicated in all of the following examples, MFP size and water flow rate are determined under conditions identical to those described above. The characterization test results of the laminates are shown in Table 1.

TABLE 1

| Example | Flow Rate (ml/min) | MFP Size (μm) | Hydrophilicity |
|---|---|---|---|
| 1 | 1714 | 0.6 | hydrophilic |
| 2 | 1600 | 0.5 | hydrophilic |

Examples 3-4 and Comparative Example 1

Laminates Containing Asymmetric Polysulfone Membranes

The dull side of a highly asymmetric polysulfone membrane having a nominal bubble point of 25 psi and a pore size of approximately 0.5 μm was laminated to either of two different lightweight nonwoven materials. The membrane was a BTS-25 membrane from US Filter. All membranes mentioned herein with the BTS designation are polysulfone membranes manufactured by US Filter. The number following the BTS designation corresponds to the nominal bubble point of the membrane in psi. One of the nonwoven materials was a 30 g/m² dry laid polyolefin identified as style FO2432 from Snow Filtration (Example 3). The other laminate was made with a wet laid polyolefin nonwoven material identified as style FO2460, also available from Snow Filtration (Example 4). The thickness of each laminate was measured (in mils), and the laminates were tested for MFP size, water flow rate, and adhesion. The filter laminates were also compared to the otherwise identical unlaminated BTS-25 membrane (Comparative Example CE 1). The test results are shown in Table 2. The samples were well laminated and had reasonable water flow rates.

TABLE 2

| Example | Thickness (mils) | Flow Rate (ml/min) | MFP size (μm) | Adhesion |
|---|---|---|---|---|
| 3 | 6.5-7.5 | 782 | 0.41 | good |
| 4 | 6.8-7.7 | 882 | 0.39 | fair |
| CE 1 | 4.0-4.8 | 1098 | 0.51 | — |

Examples 5-13 and Comparative Examples 2-4

Variations on Lamination Speed, Temperature, and Adjacent Material

Lamination of a highly asymmetric polysulfone membrane (BTS-25) was studied further at different lamination speeds and temperatures, and using different lamination materials. The membranes were laminated to various two-component, calendared, nonwoven polyester materials (Reemay type 3256, 2055, or 2033, available from Ahlstrom Filtration). For the laminates thus produced, data were recorded on MFP size and water flow rate (milliliters per minute) through a 47 mm diameter disc at 28" Hg (13.75 psid). Adhesion of the membrane to the adjacent material was also noted. The laminates were compared to the unlaminated membrane (data provided for unlaminated membranes in the Comparative Examples CE2, CE3, and CE4). All laminate samples tested had thicknesses in the range of 7.0-7.5 mils. Results are shown in Table 3.

TABLE 3

| Example | Speed (ft/min) | Reemay Type | Temp (° F.) | MFP Size (μm) | Water Flow (ml/min) | Adhesion |
|---|---|---|---|---|---|---|
| CE 2 | — | — | — | 0.44 | 1040 | NA |
| 5 | 0.7 | 2250 | 399 | NA | 732 | good |
| 6 | 2.0 | 2250 | 399 | NA | 820 | good |
| 7 | 3.4 | 2250 | 399 | 0.45 | 896 | good |
| CE 3 | — | — | — | 0.5 | 700 | NA |
| 8 | 5.6 | 2250 | 399 | NA | 690 | good |
| 9 | 4.5 | 2250 | 399 | NA | — | good |

TABLE 3-continued

| Example | Speed (ft/min) | Reemay Type | Temp (° F.) | MFP Size (μm) | Water Flow (ml/min) | Adhesion |
|---|---|---|---|---|---|---|
| 10 | 3.4 | 2204 | 370 | — | — | poor |
| 11 | 2.0 | 2204 | 370 | — | — | poor |
| CE 4 | — | — | — | 0.42 | 1000 | NA |
| 12 | 3.4 | 2204 | 399 | NA | 953 | good |
| 13 | 4.5 | 2204 | 399 | 0.48 | 1050 | good |

Examples 14-17

Lamination of Highly Asymmetric Polysulfone Membranes Having Different Pore Sizes Lamination of highly asymmetric polysulfone membranes of different pore sizes (BTS-16 and BTS-30) to a Reemay type 3256 material was studied further at different lamination speeds. For the laminates thus produced, data were recorded MFP size and water flow. Lamination temperature for each laminate thus prepared was 380° F. Adhesion of the membrane to the adjacent material was consistently good in these tests. All laminate samples tested had thicknesses in the range of 6.0 to 6.5 mils. Results are shown in Table 4. The results demonstrate that the process is robust, with changes in lamination speed having little effect on MFP size and water flow.

TABLE 4

| Example | Type | Speed (ft/min) | MFP Size (μm) | Water Flow (ml/min) |
|---|---|---|---|---|
| 14 | BTS-16 | 1.6 | 0.93 | 1525 |
| 15 | BTS-16 | 1.9 | 1.09 | 1636 |
| 16 | BTS-30 | 2.0 | 0.34 | 529 |
| 17 | BTS-30 | 2.2 | 0.33 | 643 |

Examples 18-23

Lamination of Highly Asymmetric Polysulfone Membranes to a Two-Component Calendared Polyester Lamination of highly asymmetric polysulfone membranes (BTS-25) having a variety of pore sizes to various two-component calendared polyester materials (Reemay type 3256, 2055, or 2033), was studied further at different lamination speeds. For the laminates thus produced, data were recorded on MFP size and water flow rate. The indicated shoe temperature for each laminate thus prepared was 399° F. (204° C.). Adhesion of the membrane to the adjacent material was quantitatively tested using an Instron 5542 unit (available from Instron of Canton, Mass.) to measure the force required to peel back (at a 180° angle) one layer from another in a 1"-wide laminate strip. Results are shown in Table 5.

TABLE 5

| Example | Type | Speed (ft/min) | Reemay type | MFP Size (μm) | Flow Rate (ml/min) |
|---|---|---|---|---|---|
| 18 | BTS-25 | 0.9 | 3256 | 0.45 | 693 |
| 19 | BTS-25 | 1.6 | 3256 | 0.48 | 600 |
| 20 | BTS-25 | 1.6 | 2033 | 0.37 | 600 |
| 21 | BTS-25 | 1.6 | 3256 | 0.35 | 400 |
| 22 | BTS-25 | 0.9 | 2033 | 0.47 | 643 |
| 23 | BTS-25 | 0.9 | 2055 | 0.6 | 750 |

Examples 24-25

Lamination of Highly Asymmetric Polysulfone Membranes Subjected to Different Surfactant Treatments Lamination of highly asymmetric polysulfone membranes subjected to treatment with different surfactants, either hydroxypropylcellulose (HPC) or PVP, was studied. Superior to excellent adhesion was obtained for the laminates incorporating a membrane prepared using PVP as the surfactant, as shown in Table 6. The enhanced adhesion observed for PVP is due to the inherent adhesive properties of PVP, as discussed below.

TABLE 6

| Example | Surfactant | Speed (ft/min) | Reemay Type | Temp. (° F.) | MFP Size (μm) | Flow Rate (ml/min) |
|---|---|---|---|---|---|---|
| 24 | HPC | 2.0 | 3256 | 399 | 0.4 | 700 |
| 25 | PVP | 2.0 | 3256 | 399 | 0.7 | 500 |

Examples 26-28

Lamination of Highly Asymmetric Polysulfone Membranes to Each Other

Highly asymmetric polysulfone membranes are often surface treated with PVP, by passing the newly quenched membrane through a water bath containing 0.5% PVP k-90. This treatment enhances the wettability of the membranes. The PVP in the membrane was initially introduced to initiate wetting. In its initial form its molecular weight was relatively low, but with a small percentage of sodium persulfate it crosslinked and increased in molecular weight when heated by oven drying. Prior to lamination, these PVP impregnated membranes had relatively low permeabilities and high bubble points, most likely caused by PVP plugging the pores. During lamination the membrane encounters substantially higher temperatures, and the pores become "unplugged," as evidenced by increased water permeability and lower bubble points. This suggests that at the higher temperatures the PVP that is initially encapsulated in the pores melts and flows around the network of struts in the reticulated structure of the membrane and around the fibers in the nonwoven fabric, thereby opening the pores and also creating adhesion.

The PVP treatment is also conducive to lamination of one membrane to another. Samples of laminates containing two adjacently positioned BTS-25 membranes treated with PVP were prepared. The membranes were laminated in three different orientations: skin-to-skin, skin-to-dull, and dull-to-dull, as shown in Table 7, below.

A Ledco HD-25 Laminator (from Ledco, Inc. of Hemlock, N.Y.) at an indicated shoe temperature of 400° F. (204° C.) and a speed of about 2.2 feet per minute was used in these experiments. In each case, a nonwoven polyester fabric was also laminated to one of the membranes as the lower layer in the stack, to add strength to the final product, and to prevent membrane deformation at the high temperatures required to ensure lamination. Thus, the nonwoven fabric, not the membrane, was closest to the hot shoe. Another step taken to prevent membrane deformation was the placement of parchment paper (on which was placed a protective Teflon-coated tape) over the various laminating materials as they pass together over the hot shoe. This arrangement contained the heat and helped significantly to improve the lamination strength.

Tests of water wettability and water flow rate were conducted. Water flow rate was measured at 10 psid through a 90 mm disc. The best membrane-membrane adhesion was observed between skin-to-skin, which adheres tenaciously even when wet. They could not be separated, wet or dry. The dull to dull configuration could be pulled apart when wet but not when dry. The nonwoven fabric likewise adheres much better to the shiny side of the membrane than to the dull side. In either case, the nonwoven fabric can be pulled away from the membrane laminate, more easily when wet than when dry. As an example, a 10-foot length of skin-to-skin laminate was bonded between two layers of HOLLYTEX 3256, then the laminate was pleated. Through the pleating process, no delamination occurred, either between the membranes or between the membrane and the HOLLYTEX.

TABLE 7

| Example | Lamination Type | Temp. (° F.) | MFP Size (μm) | Flow Rate (ml/min) | Bubble Point (psi) |
|---|---|---|---|---|---|
| 26 | skin-to-skin | ~400 | 0.43 | 1210 | 35 |
| 27 | skin-to-dull | ~400 | 0.41 | 2153 | 30 |
| 28 | dull-to-dull | >400 | 0.43 | 2010 | 30 |

Examples 29-83

Membrane Laminated to Polyester or Nylon, with and without Using Hot Melt

In order to increase the strength of asymmetric membranes, the membranes may be bonded to polyester and/or nylon. Prior to lamination, such membranes exhibit typical breaking strengths of 300 g/cm width. After lamination, the breaking strength may be increased to 800-3000 g/cm width.

Adhesion of the membrane to the support may be achieved in various ways. One way is to press the membrane onto the laminate material (for example, nylon, polyester, or paper) as it passes over the heat. The downward force is placed on the membrane as it passes over the heated shoe by securing in place a Teflon shield over the membrane. A second method utilizes a "rolling" shield. In this method, the membrane is sandwiched between two layers of polyester as it passes over the heating element. The top layer of laminate is unwound under higher tension to force the membrane down onto the bottom adhering laminate layer. The top non-adhering layer may then be peeled off, resulting in a membrane bonded to a laminate material. These methods are only suitable for use with "open" materials, i.e., large pore size membranes. Tighter, smaller pore membranes trap too much heat during the adhesion process, destroying the properties of the laminated material.

When laminating hot melt to the shiny side of an asymmetric membrane, a loss of flow due to the hot melt material blocking pores may occur. To prevent this blocking, a two-stage lamination process may be used. The process may also be used to laminate hot melt material to the dull side of an asymmetric membrane. In the first stage, the hot melt material is bonded to a woven or non-woven material on a first heating element. The first stage limits the hot melt coverage to only the woven or non-woven surface. In the second stage, the material from the first stage is bonded to a membrane when the hot melt is reactivated as the two materials are passed over a second heating element.

Table 8 and Table 9 illustrate the before and after properties (Examples 29, 31 and 30, 32, 33, respectively) of typical open materials, including a highly asymmetric polysulfone membrane having a nominal bubble point of 25 psi and a pore size of approximately 0.5 μm (BTS-25) and an inherently hydrophilic polysulfone membrane having a pore size of approximately 8 μm (MMM8 available from US Filter). The membranes were laminated to a polyester support (Reemay 3256) by passing the membrane on top of the polyester support over a hot shoe at a speed of 2 feet per minute at a shoe temperature of from 370° F. to 380° F. A Teflon shield was secured in place over the membrane. In the lamination of Table 8, Example 30, the flow and bubble point stayed fairly close to the original values (less than 20% loss in value when compared with the membrane prior to lamination). In the lamination of Table 9, Example 32, the MFP size actually became tighter (corresponding to an increase in filtration capability) due to the tortuous path of the laminate material. In the lamination of Table 9, Example 33, the support was laminated to the smaller pore sized side of the membrane (shiny or skin side) rather than the larger pore sized side (dull or open side), also resulting in a slight reduction of MFP size (smaller pore size in the final material).

TABLE 8

| Example | Type | Flow Rate (ml/min) | Bubble Point (psi) | Speed (ft/min) | Temp. (° F.) |
|---|---|---|---|---|---|
| 29 | BTS-25 (before lamination) | 3362 | 31 | — | — |
| 30 | BTS-25 (after shiny lamination) | 3750 | 26 | 2 | 380 |

TABLE 9

| Example | Type | MFP Size (μm) | Strength (g/cm) | Thickness (μm) | Speed (ft/min) | Temp. (° F.) |
|---|---|---|---|---|---|---|
| 31 | MMM8 (before lamination) | 8.5 | 186 | 122 | — | — |
| 32 | MMM8 (after dull lamination) | 6.2 | 954 | 162 | 2 | 375 |
| 33 | MMM8 (after dull lamination) | 6.4 | 934 | 170 | 2 | 380 |

Table 10 illustrates the degradation of flow rate and bubble point as the quality of adhesion improves for an asymmetric polysulfone membrane (BTS-45) adhered to a polyester support (Reemay 3256) by passing the membrane on top of the support over a hot shoe at a speed of 2 feet per minute at a shoe temperature ranging from 365° F. to 380° F. A Teflon shield was secured in place over the membrane. For Example 37, although the flow rate was close to that of the membrane before lamination, there was still a 15% loss in bubble point and the adhesion was not acceptable.

TABLE 10

| Example | Temp. (° F.) | Speed (ft/min) | Flow Rate (ml/min) | Bubble Point (psi) | Comment |
|---|---|---|---|---|---|
| 34 | NA | NA | 1516 | 52 | membrane before lamination |
| 35 | 380 | 2 | 500 | <30 | excellent adhesion |
| 36 | 375 | 2 | 1380 | 35 | good adhesion |
| 37 | 365 | 2 | 1640 | 44 | poor adhesion |

Use of a polyester hot melt material (designated FB-117-A, available from Chicopee, Inc. of North Little Rock, Ark.) was investigated as a means to form a tighter bond between the membrane and the laminate. An asymmetric polysulfone membrane (BTS-55) was laminated to a polyester support (Reemay 3256) using the hot melt by passing the layers under tension over a hot shoe at a speed of 2 feet per minute at a shoe temperature ranging from 345° F. to 375° F. As illustrated in Table 11, increasing the temperature eventually resulted in adhesion. However, the temperature required to gain adhesion was too high, significantly reducing the bubble point.

TABLE 11

| Example | Temp. (° F.) | Speed (ft/min) | Flow Rate (ml/min) | Bubble Point (psi) | Comment |
|---|---|---|---|---|---|
| 38 | NA | NA | 1300 | 57 | membrane before lamination |
| 39 | 345 | 2 | NA | NA | 50% adhesion, air pockets in the web |
| 40 | 350 | 2 | NA | NA | 50% adhesion, air pockets in the web |
| 41 | 360 | 2 | NA | NA | 75% adhesion, air pockets |
| 42 | 370 | 2 | NA | NA | 95% adhesion, air pockets |
| 43 | 375 | 2 | 1120 | 35 | adhesion across the web, poor bubble point |

Another polyester hot melt, designated PE85 (available from Bostik, Inc. of Middleton, Mass.) was also investigated. As illustrated in Table 12, a temperature of 255° F. was found to provide good adhesion between an asymmetric polysulfone membrane (BTS-65) laminated to a polyester support (Reemay 3256). Using the hot melt method as described above, the flow rate and bubble point of dull side lamination remained within 80% of the original values.

TABLE 12

| Example | Temp. (° F.) | Speed (ft/min) | Tension (quarter turns of a tension knob) | Flow Rate (ml/min) | Bubble Point (psi) | Result |
|---|---|---|---|---|---|---|
| 44 | NA | NA | NA | 862 | 69 | membrane only |
| 45 | 255 | 5 | 1.5/1/1.5 | 1007 | 58 | good (laminated to dull side) |
| 46 | 255 | 5 | 1.5/1/1.5 | 521 | 48 | good (laminated to skin side) |

Tables 13 through 15 list before and after lamination results for other membrane grades (all available from US Filter), including BTS-65H (a hydrophobic asymmetric polysulfone membrane having a bubble point of 65); MMM2 (a polysulfone membrane having a MFP of 2 µm) and MMM5 (a polysulfone membrane having a MFP of 5 µm); BTS-16, BTS-25, BTS-30, BTS-25, BTS-45, BTS-55, BTS-65, and BTS-100 (all assymetric polysulfone membranes rendered hydrophilic via treatment with a surfactant); and BTS-XH (a hydrophobic asymmetric polysulfone membrane having a reference bubble point of 2) laminated to a polyester support (Reemay 3256) or a nylon support (Cerex Nylon, a nonwoven fabric having 1 oz per square yard basis weight, available from Western Nonwovens of Carson, Calif.). The membranes were all laminated using the PE85 polyester hot melt, as described above, or a polyamide hot melt (PA115 available from Bostik, Inc.).

Flow rate and bubble point for a laminate produced by the lamination of a hydrophobic material (BTS-65H) to a polyester support (Reemay 3256) using the PE85 polyester hot melt are presented in Table 13.

TABLE 13

| Example | Type | Flow Rate (ml/min) | Bubble Point (psi) | Comment |
|---|---|---|---|---|
| 47 | BTS-65H | 7.3 | 34 | — |
| 48 | BTS-65H (after dull lamination) | 7.1 | 25 | — |
| 49 | BTS-65H | 6.8 | 30 | — |
| 50 | BTS-65H (after dull lamination) | 9.7 | 28 | scratched during lamination |
| 51 | BTS-65H | 8.9 | 30 | — |
| 52 | BTS-65H (after dull lamination) | 7.9 | 28 | — |

The effect of lamination speed on the MFP, flow rate, bubble point and tenacity of a laminate produced by the lamination of a polysulfone membrane (MMM3) to a polyester support (Reemay 3256) using the PE85 polyester hot melt are presented in Table 14. The data demonstrate the robustness of the operation in that the properties of the laminate are relatively unaffected by the speed at which lamination is conducted.

TABLE 14

| Example | Type | Speed (ft/min) | MFP Size (µm) | Flow Rate (cc/min-cc $H_2O$-$cc^2$) | Bubble Point (psi) | Tenacity (g) |
|---|---|---|---|---|---|---|
| 53 | MMM5 | NA | 3.2 | 26109 | 6 | NA |
| 54 | MMM5 after lamination to Reemay 3256 polyester | 10 | 2.5 | 13952 | 8 | 20 |
| 55 | MMM5 after lamination Reemay 3256 polyester | 2.5 | 3.0 | 14465 | 7 | 15 |
| 56 | MMM5 after lamination Reemay 3256 polyester | 10 | 3.8 | 16022 | 4 | 16 |

The effect on flow rate and bubble point of lamination of a support to either the dull (open or large pore) or shiny (tight or smaller pore) side of an asymmetric polysulfone membrane using a hot melt was investigated. An internally hydrophilic asymmetric polysulfone membrane (BTS-25) was laminated dull side or shiny side to a polyester support (Reemay 3256) using the PE85 polyester hot melt. The data, presented in Table 15, demonstrate a significant loss of flow for lamination of the support to the shiny side of the membrane.

TABLE 15

| Example | Type | Flow Rate (ml/min) | Bubble Point (psi) |
|---|---|---|---|
| 57 | BTS-25 | 3362 | 31 |
| 58 | BTS-25 after dull lamination to Reemay 3256 polyester | 2840 | 23 |
| 59 | BTS-25 after shiny lamination to Reemay 3256 polyester | 444 | 28 |
| 60 | BTS-65H | 8.9 | 30 |
| 61 | BTS-65H after dull lamination to Reemay 3256 polyester | 7.9 | 28 |
| 62 | BTS-65H | 6.3 | 50 |
| 63 | BTS-65H after shiny lamination to Reemay 3256 polyester | 5.4 | 38 |

When a membrane is laminated to nylon rather than polyester, the breaking strength of the laminate is much higher. This increased strength is attributable to the greater strength of the nylon support when compared to the strength of the polyester support. Table 16 provides data on flow rate, bubble point, and strength for laminates consisting of asymmetric polysulfone membranes (BTS-55 and MMM2) laminated dull side to Cerex Nylon support (1 oz per square yard basis weight) using a polyamide hot melt (PA115).

TABLE 16

| Example | Type | Flow Rate (ml/min) | Bubble Point (psi) | Strength (g/cm) | Thickness (μm) | Comment |
|---|---|---|---|---|---|---|
| 64 | BTS-55 | 1199 | 51 | 433 | 124 | — |
| 65 | BTS-55 after dull lamination to nylon | 1246 | 40 | 3029 | 242 | — |
| 66 | MMM2 | 25188 | 4 | 444 | 192 | — |
| 67 | MMM2 after dull lamination to nylon | 22905 | NA | 3200 | 401 | — |
| 68 | MMM2 | 25387 | NA | 521 | 167 | — |
| 69 | MMM2 after dull lamination to nylon | 33172 | NA | NA | NA | flow increase due to $2^{nd}$ heating |

Table 17 provides data on flow rate, bubble point, and strength data for laminates consisting of several different asymmetric polysulfone membranes (having different bubble points) laminated dull side to a Reemay 3256 polyester support using a polyester hot melt (PE85). The data show that the strength of the laminate can be increased three or four fold over that of the membrane itself with only a minor loss in flow and bubble point.

TABLE 17

| Example | Type | Flow Rate (ml/min) | Bubble Point (psi) | Strength (g/cm) | Thickness (μm) |
|---|---|---|---|---|---|
| 70 | BTS-100 | 638 | 101 | 617 | 125 |
| 71 | BTS-100 after lamination to Reemay 3256 (dull) | 588 | 96 | 1815 | 192 |
| 72 | BTS-65 | 1002 | 67 | 390 | 130 |
| 73 | BTS-65 after lamination to Reemay 3256 (dull) | 932 | 55 | 1786 | 183 |
| 74 | BTS-45 | 1918 | 50 | 379 | 132 |
| 75 | BTS-45 after lamination to Reemay 3256 (dull) | 1654 | 47 | 1420 | 193 |
| 76 | BTS-30 | 2490 | 36 | 332 | 124 |
| 77 | BTS-30 after lamination to Reemay 3256 (dull) | 2032 | 35 | 1693 | 192 |
| 78 | BTS-25 | 3775 | 21 | 420 | 123 |

TABLE 17-continued

| Example | Type | Flow Rate (ml/min) | Bubble Point (psi) | Strength (g/cm) | Thickness (μm) |
|---|---|---|---|---|---|
| 79 | BTS-25 after lamination to Reemay 3256 (dull) | 4351 | 18 | 1764 | 185 |
| 80 | BTS-16 | 6721 | 12 | 421 | 127 |
| 81 | BTS-16 after lamination to Reemay 3256 (dull) | 5456 | 12 | 1524 | 190 |
| 82 | BTS-XH | 54.7 | 4 | 348 | 144 |
| 83 | BTS-XH after lamination to Reemay 3256 (dull) | 53.3 | 3 | 1534 | 218 |

Examples 84-107

Membrane Laminated Between Two Layers of Non-Woven Material

In order to improve strength and rigidity in the laminate, a polyester/membrane/polyester lamination can be conducted. In such a lamination technique, the temperature is raised to a sufficient level to engage the membrane properties (i.e., those of the base material and a surfactant) and/or the support material properties into the adhesion process. In this particular technique, the "tighter" or smaller pore size membrane grades (those of approximately 0.2 μm and smaller) tend to lose some degree of both flow rate and bubble point under higher temperature. Table 18 lists the before and after lamination test results for several polyester/membrane/polyester laminates prepared using Reemay 3256 polyester and MMM5 polysulfone membrane. The polysulfone membrane was prepared from a dope containing PVP which imparts both hydrophilicity and adhesive properties to the membrane. Because of the inherent adhesive properties of the membrane, no hot melt was necessary for adhesion of the laminate layers. The lamination was observed to have little effect on the MFP size. It is believed that the lamination process results in a tighter distribution of porosity, with lamination blocking altogether the smallest pores and partially blocking the largest pores on the surface of the membrane.

TABLE 18

| Example | Type | Temp. (° F.) | Speed (ft/min) | MFP Size (μm) | Thickness (μm) | Strength (g/cm) |
|---|---|---|---|---|---|---|
| 84 | MMM5 | NA | NA | 5.2 | 120 | 208 |
| 85 | MMM5 after lamination | 376 | 2.5 | 4.1 | 188 | 2782 |
| 86 | MMM5 | NA | NA | 4.4 | 124 | 228 |
| 87 | MMM5 after lamination | 376 | 2.5 | 4.0 | 189 | 2732 |

The tenacity of laminated membranes was tested using an Instron 5542 strength testing machine. In the tenacity test, a corner of a 1 cm laminate strip is peeled back. When peeled back, one the polyester layers remains adhered to the membrane on one side, while the polyester on the other side of the membrane is peeled back. The membrane and attached polyester are grasped in one jaw of a vice in the Instron 5542 and the force required to peel back the other polyester layer, attached by a vice to a load cell in the device, is measured. Results of this tenacity test are provided in Table 19. The base membrane was a MMM5 polysulfone membrane having a MFP of 5.0 μm, a thickness of 121 μm, and a strength of 231 g/cm. The polyester layers were Reemay 3256. In certain experiments, a PE85 hot melt was used.

TABLE 19

| Example | Type | Temp. (° F.) | Flow Rate (ml/min) | Bubble Point (psi) | Thickness (μm) | Wetting | Tenacity (g) |
|---|---|---|---|---|---|---|---|
| 88 | MMM5 (dull) to Reemay 3256 (no hot melt) | 376 | 30417 | 5 | 187 | 1 | 5 |
| 89 | MMM5 (dull) to Reemay 3256 with PE85 hot melt | 376 | 28791 | 4 | 222 | 1 | 6 |
| 90 | MMM5 (dull) to Reemay 3256 (no hot melt) | 376 | 29685 | 4 | 184 | 1 | 5 |
| 91 | MMM5 (dull) to Reemay 3256 with PE85 hot melt | 394 | 26715 | 3 | 186 | 4 | 8 |
| 92 | MMM5 (dull) to Reemay 3256 (no hot melt) | 400 | 27774 | 3 | 198 | 1 | 11 |

TABLE 19-continued

| Example | Type | Temp. (°F.) | Flow Rate (ml/min) | Bubble Point (psi) | Thickness (μm) | Wetting | Tenacity (g) |
|---|---|---|---|---|---|---|---|
| 93 | MMM5 (dull) to Reemay 3256 (no hot melt) | 395 | 28366 | 3 | 188 | 1 | 17 |
| 94 | MMM5 (dull) to Reemay 3256 (no hot melt) | 390 | 28494 | 3 | 192 | 1 | 7 |
| 95 | MMM5 (dull) to Reemay 3256 (no hot melt) | 385 | 30440 | 4 | 200 | 1 | 4 |
| 96 | MMM5 (dull) to Reemay 3256 (no hot melt) | 398 | 28214 | 4 | 188 | 1 | 9 |
| 97 | MMM5 (dull) to Reemay 3256 (no hot melt), Teflon shield used | 376 | 28902 | 4 | 200 | 1 | 4 |

The data above show that laminates prepared at a temperature of 395° F. demonstrated high tenacity when compared to laminates prepared at lower temperatures. At a higher temperature of 396° F., a substantial increase in tenacity is observed over that observed for laminates prepared at 395° F. Table 20 provides MFP size data for laminates prepared at both 395° F. and 396° F.

TABLE 20

| Example | Type | Temp. (°F.) | MFP Size (μm) | Thickness (μm) | Tenacity (g) |
|---|---|---|---|---|---|
| 98 | MMM5 | NA | 5.6 | 124 | NA |
| 99 | Reemay 3256/ MMM5/ Reemay 3256 | 395 | 4.4 | 181 | 10.5 |
| 100 | MMM5 | NA | 5.3 | 118 | NA |
| 101 | Reemay 3256/ MMM5/ Reemay 3256 | 395 | 4.9 | 176 | 8 |
| 102 | MMM5 | NA | 5.2 | 124 | NA |
| 103 | Reemay 3256/ MMM5/ Reemay 3256 | 395 | 3.2 | 191 | 11 |
| 104 | MMM5 | NA | 5.1 | 144 | NA |
| 105 | Reemay 3256/ MMM5/ Reemay 3256 | 396 | 4.6 | 216 | 15 |
| 106 | MMM5 | NA | 6.5 | 154 | NA |
| 107 | Reemay 3256/ MMM5/ Reemay 3256 | 396 | 4.8 | 215 | 14 |

Examples 108-111

Membrane Laminated to Mylar

Another lamination technique useful for lateral flow and other applications is the lamination of membrane to Mylar. The product of this lamination technique is a thick material for suitable for absorbing purposes. The lamination is accomplished through the use of a rolling platform wherein a polyester layer is the bottom layer passed over the heat. Atop the polyester layer is the Mylar layer, then a hot melt layer, then the membrane. The Mylar will not pass over the heat smoothly so the polyester acts as a carrier. In the examples of Table 21, the membrane is a 2 μm pore size polysulfone membrane or a BTS-10 polysulfone membrane, the hot melt layer is PE85 polyester, the Mylar layer is 516 Melonex (available from Tekra of New Berlin, Wisc.), and the polyester layer is Reemay 3256.

TABLE 21

| Example | Type | Temp. (°F.) | Speed (ft/min) | Thickness (μm) | Wetting (seconds) |
|---|---|---|---|---|---|
| 108 | 2 μm polysulfone before lamination | NA | NA | 334 | 0.5 |
| 109 | 2 μm polysulfone after lamination | 300 | 2 | 380 | 210 |
| 110 | BTS-10 before lamination | NA | NA | 124 | 1 |
| 111 | BTS-10 after lamination | 280 | 2.5 | 230 | 1 |

Examples 112-120

Membrane Laminated to Membrane

As discussed above, membrane may also be laminated to membrane. In this form, the second layer of the laminate acts as a pre-filter. The breaking strength and the thickness of the laminate are increased, so applications that require additional thickness or slight increases in strength may benefit from this technique. A hot melt may optionally be used between the membrane layers. The membrane has, however, some degree of inherent capability to adhere to a material. The adhesive capability of the membrane can be due to the constituents of the membrane material itself or of a coating applied to the membrane, e.g., to render the membrane hydrophilic. Table 22 provides data for membrane-to-membrane lamination experiments, the membranes including BTS-5, BTS-13, BTS-16, and BTS-25. All membranes were rendered hydrophilic via treatment with a PVP surfactant.

TABLE 22

| Example | Type | Temp. (° F.) | Speed (ft/min) | Flow Rate (ml/min) | Bubble Point (psi) | Thickness (μm) | Strength (g/cm) |
|---|---|---|---|---|---|---|---|
| 112 | BTS-5 before lamination | NA | NA | 12472 | 5 | 129 | 346 |
| 113 | BTS-25 before lamination | NA | NA | 3362 | 31 | 128 | 394 |
| 114 | BTS-5 shiny/ BTS25 dull | 395 | 2 | 1159 | 27 | 281 | 884 |
| 115 | BTS-16 before lamination | NA | NA | 5123 | 14 | 125 | 408 |
| 116 | BTS-5 before lamination | NA | NA | 10395 | 4 | 123 | 348 |
| 117 | BTS16 shiny/ BTS5 dull | 395 | 2.5 | 9164 | 8 | 211 | 530 |
| 118 | BTS-5 before lamination | NA | NA | 10120 | 5 | 126 | 371 |
| 119 | BTS-13 before lamination | NA | NA | 5967 | 13 | 126 | 413 |
| 120 | BTS5 shiny/ BTS13 dull | 395 | 2.5 | 8141 | 11 | 224 | — |

Examples 121-124

Membrane Laminated to Hot Melt Only

A membrane's adhesive properties may, depending upon the application, be insufficient, resulting in problems, e.g., in their performance in devices or cartridges. One solution is to apply a hot melt layer to the membrane, thereby providing a laminate with adhesive properties superior to those of the membrane itself. The strength of the laminate is slightly increased over that of the membrane itself, and a heat-activated bonding agent is in place over the membrane. Such laminates may include a polyester layer laminated to the membrane. Table 23 reports data for a polysulfone BTS-25 membrane before and after application of a PE85 polyester hot melt adhesive layer.

TABLE 23

| Example | Type | Temp. (° F.) | Speed (ft/min) | Flow Rate (ml/min) | Bubble Point (psi) | Thickness (μm) | Strength (g/cm) |
|---|---|---|---|---|---|---|---|
| 121 | membrane before application | NA | NA | 3362 | 31 | 128 | 394 |
| 122 | membrane after application | 280 | 2 | 3141 | 28 | 209 | 456 |
| 123 | membrane before application | NA | NA | 1199 | 51 | 124 | 433 |
| 124 | membrane after application | 280 | 2.5 | 1242 | 48 | 236 | 527 |

Examples 125-130

Membrane Laminated to Woven Material

In applications wherein consistency or criticality of the laminate's properties is important, it is preferred to laminate a membrane to a woven material rather than a non-woven material. Woven materials are generally more expensive than non-woven materials. Non-woven materials are generally preferred over woven materials for pleated filter applications due to the larger area of the filter cartridge, and thus greater cost due to the quantity of woven material that would be required. However, woven materials have very consistent strand-to-strand dimensions, which make them preferred for time-release and reagent applications, and especially medical device applications. Table 24 reports data for a polysulfone BTS-25 membrane before and after lamination to a fine nylon mesh (SEFOR NYLON Fine Mesh, Sefor America Inc., Depew, N.Y.), a polysulfone BTS-45 membrane before and after lamination to a coarse nylon mesh (SAATITECH NYLON Coarse Mesh, SaatiTech Inc., Stamford, Conn.), and a polysulfone BTS-65 membrane before and after lamination to SEFOR NYLON Fine Mesh. PE85 polyester hot melt adhesive was used to prepare each of the laminates of Table 24.

TABLE 24

| Example | Type | Flow Rate (ml/min) | Bubble Point (psi) | Thickness (μm) | Strength (g/cm) |
| --- | --- | --- | --- | --- | --- |
| 125 | BTS-25 | 3083 | 33 | 135 | 386 |
| 126 | BTS-25/SEFOR Fine Mesh | 3307 | 29 | 208 | 4988 |
| 127 | BTS-45 | 1523 | — | 125 | 374 |
| 128 | BTS-45/ SAATITECH Coarse Mesh | 1450 | — | 633 | — |
| 129 | BTS-65 | 946 | — | 126 | 412 |
| 130 | BTS-65/SEFOR Fine Mesh | 1168 | — | 198 | 4631 |

Examples 131-136

Flat Lamination at Low Temperature

Certain applications require laminates that do not exhibit a curl. Curl is due to the pick-and-place nature of a high volume laminate production operation. To increase the flatness of the laminate, lower bonding temperatures are used. The lower temperatures limit the activation of the lamination components, reducing curl of the composite. Table 25 provides data for lamination of a polysulfone BTS-45 membrane to PE85 polyester hot melt adhesive at temperature of 200° F. and 260° F.

TABLE 24

| Example | Type | Temp. (° F.) | Flow Rate (ml/min) | Bubble Point (psi) | Thickness (μm) | Strength (g/cm) | Comment |
| --- | --- | --- | --- | --- | --- | --- | --- |
| 131 | before lamination | NA | — | 125 | 374 | — | — |
| 132 | after lamination | 200 | — | — | 213 | 1516 | flat |
| 133 | before lamination | NA | — | 125 | 374 | — | — |
| 134 | after lamination | 260 | — | — | 213 | 1516 | excessive curl |
| 135 | before lamination | NA | 53 | — | — | — | — |
| 136 | after lamination | 200 | 43 | — | — | — | flat |

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A filter laminate, comprising:
a plurality of discrete layers of material, wherein each layer is adjacent at least one other layer, said plurality of discrete layers comprising:
a first membrane, wherein said first membrane is an asymmetric membrane having a skin surface and an open surface, wherein pores of the open surface are larger than pores of the skin surface, and wherein said asymmetric region comprises flow channels that gradually increase in diameter from said skin surface to said open surface;
a second membrane, wherein said second membrane is an asymmetric membrane having a skin surface and an open surface, wherein pores of the open surface are larger than pores of the skin surface, and wherein said asymmetric region comprises flow channels that gradually increase in diameter from said skin surface to said open surface; and
a bond between the skin surface of the first membrane and the skin surface of the second membrane, wherein the filter laminate has a higher bubble point than either the first membrane or the second membrane, wherein a bubble point of the filter laminate is greater than a bubble point of the first membrane layer and the second membrane layer in a skin-to-skin configuration without bonding, and wherein the filter laminate has a greater integrity than a combination wherein the skin surface of the first membrane and the skin surface of the second membrane are adjacent to each other but not bonded to each other, wherein the filter laminate has a flow rate therethrough such that the filter laminate is configured for separation by filtration.

2. The filter laminate of claim 1, wherein the bond is a hot melt adhesive heat-bonded to said skin surface of said first membrane and to said skin surface of said second membrane.

3. The filter laminate of claim 1, further comprising a layer comprising a material selected from the group consisting of polyester, polypropylene, polyolefin, polyethylene, nylon, paper, cellulose, glass fiber, and acrylic.

4. The filter laminate of claim 3, wherein said material is selected from the group consisting of nonwoven fibrous material, woven fibrous material, web material, sheet material, calendared material, wet laid material, dry laid material, and extruded material.

5. The filter laminate of claim 1, wherein said asymmetric region of at least one of said first membrane and said second membrane comprises a reticular network of flow channels.

6. The filter laminate of claim 1, further comprising a third membrane.

7. The filter laminate of claim 6, further comprising a bond between the third membrane and either the first membrane or the second membrane, wherein the bond between the third membrane and either the first membrane or the second membrane is a hot melt adhesive heat-bonded to said third membrane and either the first membrane or the second membrane.

8. The filter laminate of claim 1, wherein said first membrane and said second membrane comprises a polymer selected from the group consisting of polyvinylidene fluoride, polyarylsulfone, polyethersulfone, polyamides, and cellulosic derivatives.

9. The filter laminate of claim 1, wherein the bond is formed from a nonwoven fibrous material, a woven fibrous material, or an open extruded material.

10. The filter laminate of claim 1, wherein the filter laminate is permeable to water.

11. The filter laminate of claim 1, wherein the bond is a web hot melt adhesive.

12. The filter laminate of claim 1, wherein the bond comprises bicomponent fibers containing both a low melting component and a high melting component, wherein the low melting component melts and forms a bond at a temperature at which the high melting component, the first membrane, and the second membrane survive unchanged.

13. The filter laminate of claim 1, wherein the first membrane and the second membrane have different skin pore sizes.

14. The filter laminate of claim 1, wherein the first membrane and the second membrane have same skin pore sizes.

15. The filter laminate of claim 1, wherein, for at least one of the first membrane and the second membrane, said pores of said open surface have an average diameter at least about 10 times greater than an average diameter of said pores of said skin surface.

16. The filter laminate of claim 1, wherein, for at least one of the first membrane and the second membrane, said pores of said open surface have an average diameter at least about 5 times greater than an average diameter of said pores of said skin surface.

17. The filter laminate of claim 16, wherein, for at least one of the first membrane and the second membrane, an average diameter of said pores of said skin surface is from about 0.01 µm to about 10.0 µm.

18. The filter laminate of claim 16, wherein, for at least one of the first membrane and the second membrane, an average diameter of said pores of said skin surface is less than about 0.01 µm.

19. A filter laminate, comprising:
a plurality of discrete layers of material, wherein each layer is adjacent at least one other layer, said plurality of discrete layers comprising:
a first membrane, wherein said first membrane is an asymmetric membrane having a skin surface and an open surface, wherein pores of the open surface have an average diameter at least about 5 times greater than an average diameter of pores of the skin surface, and wherein said asymmetric region comprises flow channels that gradually increase in diameter from said skin surface to said open surface;
a second membrane, wherein said second membrane is an asymmetric membrane having a skin surface and an open surface, wherein pores of the open surface have an average diameter at least about 5 times greater than an average diameter of pores of the skin surface, and wherein said asymmetric region comprises flow channels that gradually increase in diameter from said skin surface to said open surface; and
a bond between the open surface of the first membrane and the open surface of the second membrane, wherein the filter laminate has a flow rate therethrough such that the filter laminate is configured for separation by filtration.

20. The filter laminate of claim 19, wherein, for at least one of the first membrane and the second membrane, an average diameter of said pores of said skin surface is from about 0.01 µm to about 10.0 µm.

21. The filter laminate of claim 19, wherein, for at least one of the first membrane and the second membrane, an average diameter of said pores of said skin surface is less than about 0.01 µm.

* * * * *